March 14, 1967 F. J. LUKETA 3,308,568
POLYHEDRAL TRAWL DOOR
Original Filed Aug. 24, 1962 10 Sheets-Sheet 1

INVENTOR.
FRANK J. LUKETA
BY
Reynolds & Christensen
ATTORNEYS March 14, 1967   F. J. LUKETA   3,308,568
POLYHEDRAL TRAWL DOOR
Original Filed Aug. 24, 1962   10 Sheets-Sheet 2

INVENTOR.
FRANK J. LUKETA
BY
Reynolds & Christensen
ATTORNEYS

INVENTOR.
FRANK J. LUKETA
BY
Reynolds + Christensen
ATTORNEYS

March 14, 1967 F. J. LUKETA 3,308,568
POLYHEDRAL TRAWL DOOR
Original Filed Aug. 24, 1962 10 Sheets-Sheet 7

INVENTOR.
FRANK J. LUKETA
BY
Reynolds & Christensen
ATTORNEYS

March 14, 1967 F. J. LUKETA 3,308,568
POLYHEDRAL TRAWL DOOR
Original Filed Aug. 24, 1962 10 Sheets-Sheet 8

INVENTOR.
FRANK J. LUKETA
BY
Reynolds + Christensen
ATTORNEYS

March 14, 1967 — F. J. LUKETA — 3,308,568
POLYHEDRAL TRAWL DOOR
Original Filed Aug. 24, 1962 — 10 Sheets-Sheet 10

INVENTOR.
FRANK J. LUKETA
BY Reynolds & Christensen
ATTORNEYS

United States Patent Office 3,308,568
Patented Mar. 14, 1967

3,308,568
POLYHEDRAL TRAWL DOOR
Frank J. Luketa, 5567 Greenwood Ave. N.,
Seattle, Wash. 98103
Continuation of application Ser. No. 477,283, Aug. 4, 1965, which is a continuation of application Ser. No. 219,276, Aug. 24, 1962. This application June 29, 1966, Ser. No. 564,492
20 Claims. (Cl. 43—9)

This application is a continuation of my now abandoned application Serial No. 477,283, filed August 4, 1965, as a continuation of my now abandoned application Serial No. 219,276, filed August 24, 1962, as a continuation-in-part of my now abandoned application Serial No. 837,025, filed August 31, 1959.

The present invention relates to trawl doors of the type connected to the wings or curtains of a trawl net to spread the net when towed through the water at trawling speed. Trawl doors according to the present invention are designed to operate at an optimum angle of attack to widely spread the net and net wings with minimal drag, and to this end are equipped with auxiliary hydrofoil surfaces, so related to a hydrofoil shaped posterior surface that the water flow, which would otherwise tend to break away from the posterior surface of the door at high attack angles, is maintained in smooth flow relation to the door, reducing drag and increasing "lift." Such lessening of the drag by increasing the "lift" enables an adequate lateral spreading of the net's wings with a minimum expenditure of towing power. Even a low powered trawler can thereby drag a net of large size at appreciable spread, and catch a maximum number of fish.

Trawl doors according to this invention can be adapted to midwater or to bottom trawling, but the forms of doors shown are designed primarily for use in bottom trawling, such as in conjunction with a net of the type shown in my now abandoned copending application Serial No. 362,228, filed April 24, 1964. With respect to such bottom trawl doors, a further feature of the invention has to do with tilting of the doors to improve the bottoming characteristics thereof.

The elimination of unnecessary drag is a primary object in the devising of trawl nets and accessories therefor. The more drag that can be eliminated in any trawling component the more efficient the trawling operation is. In particular, if the doors used ahead of the opposite wings or curtains of the net can be of such type as to inherently produce only minimal drag, and yet can produce a large lateral component or "lift," the wings or curtains can be spread more widely and can be extended to great lengths, thereby greatly increasing the bottom area that can be swept and the volume of the bottom space which the net sweeps. The provisions of a trawl door which in a high degree eliminates unnecessary drag and provides great lateral spreading or sheering ability is a primary object of this invention.

The usual trawl door is planar, and is dragged at a rather large angle of attack relative to the water. This door configuration and attitude are bound to produce large drag forces. Doors of hydrofoil shape have been proposed, but at angles of attack large enough to produce a wide spreading, the water tends to break away from the posterior convex surfaces of the doors, and the eddy currents thereby produced increase the drag to the point where much of the advantage of the hydrofoil shape is lost. It is an important object of this invention to provide auxiliary cambered hydrofoil surfaces or surface elements which overcome this tendency to break away, and which instead deflect the eddy currents back toward the convex hydrofoil surface, and particularly the after edge thereof, so as to create the smoothest possible flow of the water past the door. Additionally, these auxiliary hydrofoils by increasing the lateral velocity of the water flow, provide considerable lateral spreading effect or "lift," which supplements that of the main hydrofoil.

The maintenance of stability in such doors as they drag along the bottom is a further problem with which the present invention deals, and in a preferred form the door is formed with further surfaces inclined in the vertical sense, which by water reaction tend to improve its upright stability, its ability to hold to the bottom and to ride with its lower edge in contact throughout with the bottom and also to give it anti-mudding characteristics. Other provisions, mentioned hereinafter, also improve its upright stability or attitude.

The location of anchorage points on such a door, one at least for the towing warp and one or more, usually two at least, for the sweep and curtain lines which extend to the net, is an important consideration, and it is an object of this invention so to locate such anchorage means that they will create a moment tending to maintain the hydrofoil surfaces of the door at the correct angle of attack with relation to the direction of drag. Also, it is an object to locate the single point of connection of the towing warp where it will neutralize any tendency of the dragging lower edge of the door to tilt the door, and so to disturb its upright stability, but instead will maintain the door either upright in use, or inclined somewhat backwardly.

While such doors have been weighted in the vicinity of their lower edge, this normally has been done generally uniformly throughout the length of the door's lower edge, but I have found that such distribution of weight is less advantageous than a concentration of weight in a particular location, and it is an object of this invention to provide for such concentration of the weight as will best stabilize the door fore and aft. Also the weight is made removable whereby it can be adjusted in mass or location if desired.

Many trawl doors are of little thickness, and can be fabricated of plates of metal or cast of aluminum, while others are of somewhat greater thickness, and usually are made of wood reinforced by and ballasted with metal. The door of this invention is of hollow construction, and is made principally of aluminum and rubber.

All such doors of necessity must be bulky and heavy, especially when not submerged, and my U.S. Patent No. 3,006,097, granted October 31, 1961, discloses and claims automatic stanchions for securing trawl doors as they are hauled in with the net and on board the trawling vessel. One object of the present invention is to provide a trawl door particularly adapted for cooperation with such automatic stanchions.

Still further, trawl doors as now used are very heavy, particularly when out of the water, and are difficult to manage. Oftentimes, conventional trawl doors may incorporate considerable wood in their construction, in order to insure that they will remain correctly upright during setting of the net. This adds to their weight out of water, and detracts from the forces with which the doors are held down while dragging the bottom. Another object of this invention is to afford temporary buoyance to the upper part of a trawl door, as it sinks below the surface in setting, and so causes it to assume a correct attitude during setting, yet dispels this buoyance once the door assumes its correct attitude. This will avoid superfluous buoyancy in the water, and superfluous weight during subsequent hauling operations. All the necessary ballast is supplied by weights of high specific gravity, removably mounted inside the hollow core of the door.

It is desirable so to form a trawl door that it can be inverted top for bottom, and so can be used either as a port-side door or as a starboard-side door, and so that when a protective runner shoe on the door's lower edge is worn by bottom contact the door can be inverted to present the unworn originally upper edging to the bottom. It is an object of this invention to permit such inversion, particularly in a hollow door, without disturbance of its balance.

Further objects of this invention deal with the mechanical construction and strengthening of the door in relation to the stresses to which it will be subjected, its protection against damage from contact with obstructions on the bottom and the like, all of which, with further objects not specifically mentioned, will be more fully understood as this specification progresses.

In the accompanying drawings the invention is shown in alternative forms, and the principles of this invention will be explained more fully hereinafter with reference to those forms, and those features which are believed to be novel will be set forth in the accompanying claims.

FIGURES 14 to 31 illustrate a modified form of door.

Such a trawl door is towed by a towing warp from the trawling vessel, and is connected to a net trailing behind the door by a sweep line and a curtain line, which transmit the drag to the net. Two such doors are used, so shaped and oriented as to cause the curtains of the net (corresponding somewhat to the wings of a standard trawl net, but much longer, and open of mesh) to diverge widely apart and forwardly, so as to sweep the maximum bottom area. The doors themselves are generally upright in use, and during bottom trawling their lower edges ride evenly upon the bottom, and so the door must be nonbuoyant, and usually is weighted, not only to hold it down but to maintain it in upright disposition as it is set and while it sinks to the bottom, and later to assure that it rides evenly on the bottom. The orientation of conventional doors, as viewed in plan, is usually maintained at an angle of attack, relative to the direction of drag, by employing a towing bridle of four short heavy chains or links which constitutes an additional source of undesirable drag, and which spaces the common point of their anchorage undesirably and considerably outwardly from the door.

Figure 1:
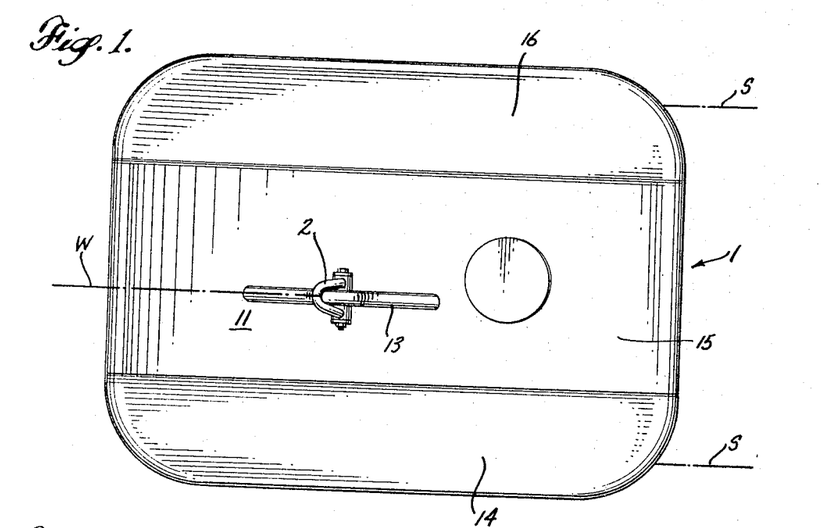
FIGURE 1 is a side elevation, looking toward the concave face or anterior surface of one form of the door.
Figure 2:
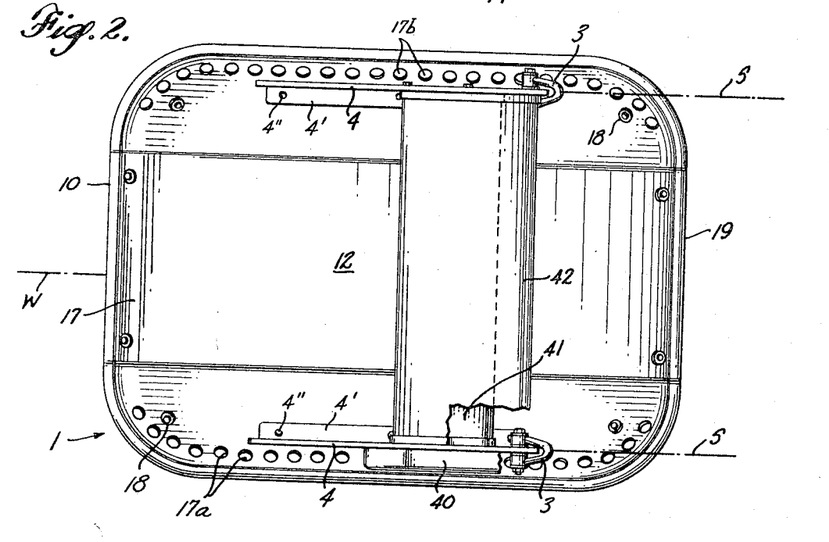
FIGURE 2 is a similar view of the convex posterior surface, with parts broken away.
Figures 7, 9:
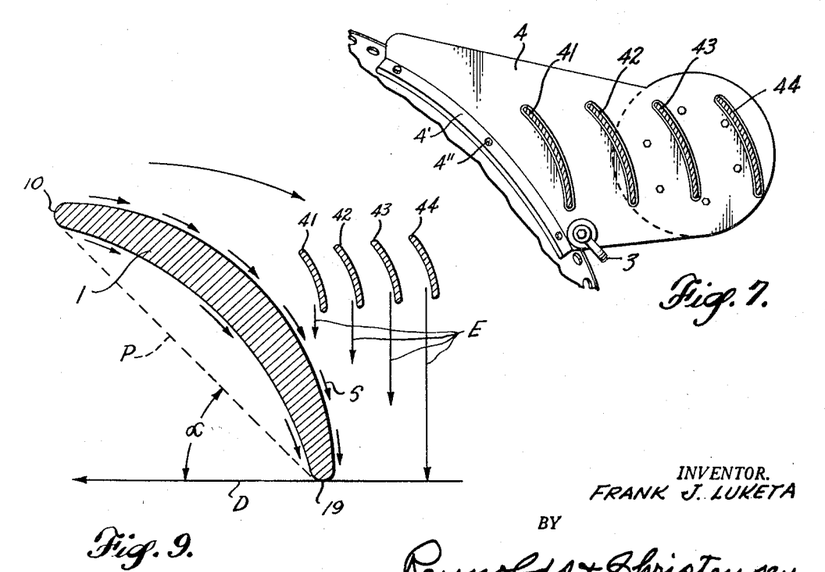
FIGURE 7 is a general sectional view of a modified form of auxiliary hydrofoil surface elements.
FIGURE 9 is a diagrammatic view similar to a top plan view, illustrating the effect of the auxiliary hydrofoil surfaces.
Figure 8:
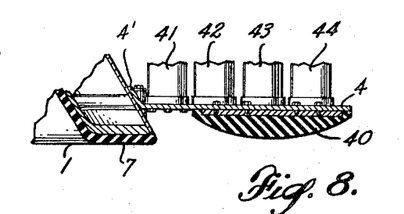
FIGURE 8 is a sectional view, similar to FIGURE 5, of the same elements.

The present door comprises a body generally designated by the numeral 1, which in the form shown, as viewed from one side or the other, is generally rectangular, though with rounded corners. It may sometimes be rounded at its forward end. The door shown, as viewed in plan (see FIGURE 4) is curved or cambered from its forward end 10 progressively toward its after end 19, although the cambered form is not strictly essential to other novel features. In other words, the body 1 has a concave anterior surface 11 and a complementally convex posterior surface 12, and the door has anchorage means for the lines mentioned above so located as to produce a moment tending to incline the general plane of the door (see, for instance, the dash-line P in FIGURE 9) at a desired fairly large angle of attack α with relation to the direction of drag D. For instance, a shackle 2 for attachment of a towing warp W is itself pivotally mounted upon a fore and aft rib 13 outstanding from but close to the anterior surface 11 of the door aft of its leading end 10, but only slightly ahead of the door's midpoint. Other shackles 3 are mounted at the posterior surface of the door, in a manner that will be explained more fully hereinafter, these being for connection to sweep and curtain lines indicated, for instance, at S in FIGURE 4. Preferably the shackle 2 for the towing warp W is mounted slightly below the longitudinal center line of the door; see FIGURES 1 and 3. Since the bottom of the door drags along the bottom, and so tends to tilt the upper edge of the door forwardly and downwardly, such a location of the shackle's anchorage to the towing warp, which trends upwardly, tends to pull the lower edge of the door forwardly and upwardly, with the net result that the opposing forces maintain the door generally upright as it is dragged through the water. The upper shackle 3 is located well above the lower edge of the door and the lower shackle 3 is located close to the lower edge, both well aft of the location of the shackle 2. The relative location of these forward and after anchorage means is such that a moment is created between them, if the door is disoriented, this moment tending to incline the general plane P of the door at the selected angle $\alpha$ with relation to the direction of drag (see FIGURE 9). The optimum angle of attack $\alpha$ with a door incorporating the principles of this invention has been found to be approximately 45°.

The door is thus oriented in actual use to an appreciable degree in accordance with the moment produced between the anchorages 2 and 3, between anchorage 2 and the bottom, and between anchorage 2 and the midpoint of the door, and when so oriented its cambered surfaces 11 and 12 near the leading end 10 make but a small angle of attack with relation to the direction of drag, but with the progressive curvature of these hydrofoil surfaces 11 and 12 the angle of attack becomes increasingly steep, until it reaches quite a high angle adjacent the trailing edge 19.

Figure 10:
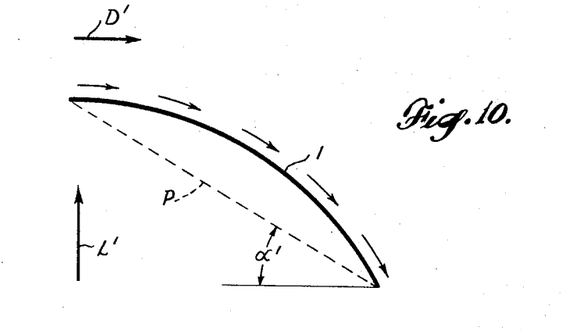
FIGURE 10 is a diagram illustrating water flow over a hydrofoil-shaped plate or door at a low angle of attack.
Figure 11:
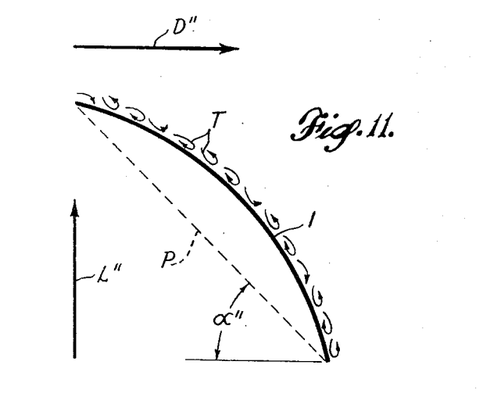
FIGURE 11 is a like diagram, but at a higher angle of attack.
Figure 12:
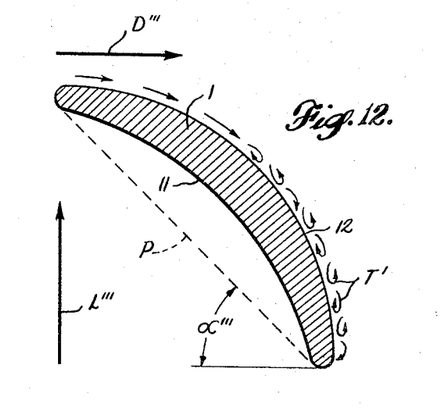
FIGURE 12 is a diagram similar to FIGURE 11, illustrating the effect of thickening the door, and increasing the curvature of the posterior surface relative to that of its anterior surface.

Towing is a relatively low-speed operation in trawling, perhaps three knots for example. With the increasing angle of attack of any longitudinally cambered surface, towards its trailing end, there is an increasing tendency for eddy currents to break away from the posterior surface thereof. If the surface is at a sufficiently low angle of attack ($\alpha'$ in FIGURE 10) and the speed is low, the drag as represented by the arrow $D'$ is low, but the "lift" $L'$ is only fair, and the door causes insufficient spreading of the net's curtains or wings. But if the angle of attack $\alpha''$ is increased, as in FIGURE 11, the lift $L''$ may be increased, but so also is the drag $D''$, for turbulence is created over much or all of the posterior surface, as the arrows T there indicate in FIGURE 11. If a simple cambered plate be replaced by a cambered body having thickness, and having a curvature at its posterior surface 12 sharper or exceeding that at its anterior surface 11, as in FIGURE 12, the lift $L''$ remains unchanged at the same angle of attack $\alpha'''$, but a decreased drag $D'''$ increases the efficiency somewhat. There is still too much drag-creating turbulence at $T'$. The posterior surface of the door, which is thickened intermediate its leading and trailing edges, may at its leading edge be presented at almost zero angle to the direction of drag, and the relative current, tangent to the leading edge curvature, tends to follow the curvature of the posterior surface as its angle to the direction of drag increases, but eventually the angle becomes so great that the current tends to break away from the surface, and turbulence results. The region of greatest thickness, where turbulence is most likely to begin, is centrally between leading and trailing edges, well back of the former.

Figure 13:
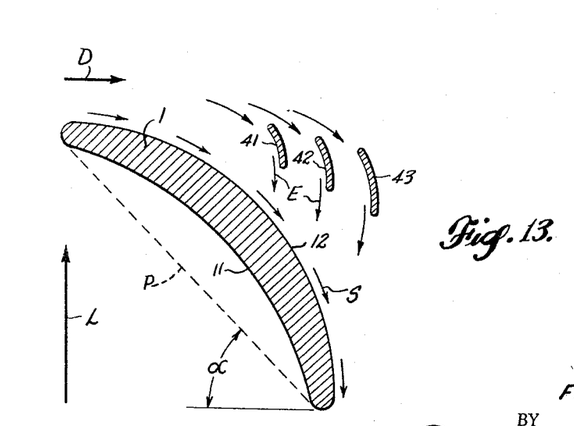
FIGURE 13 is a diagram similar to that of FIGURE 12, illustrating the effect of the added auxiliary hydrofoils in smoothing the flow of water over the posterior surface, and in increasing the velocity thereof.
Figure 14:
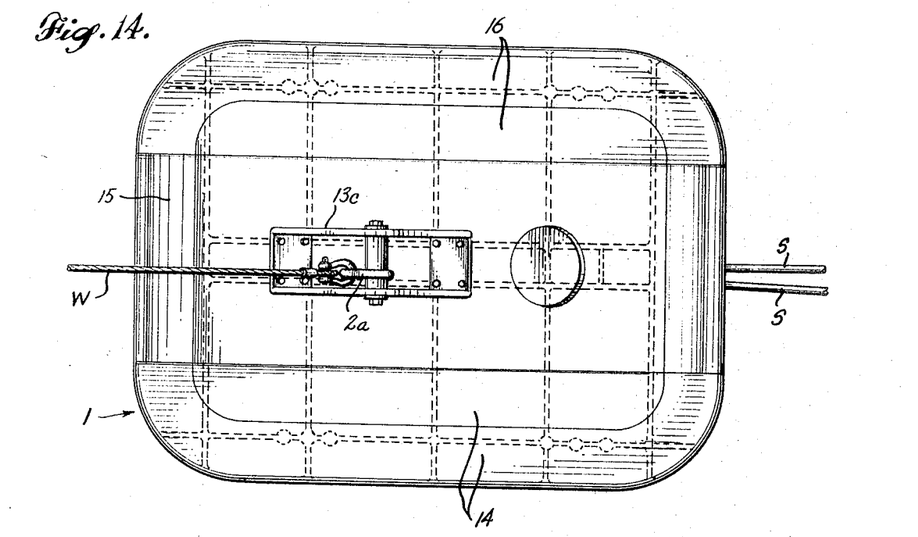
FIGURE 14 is an anterior face view, similar to FIGURE 1.
Figures 15, 31:
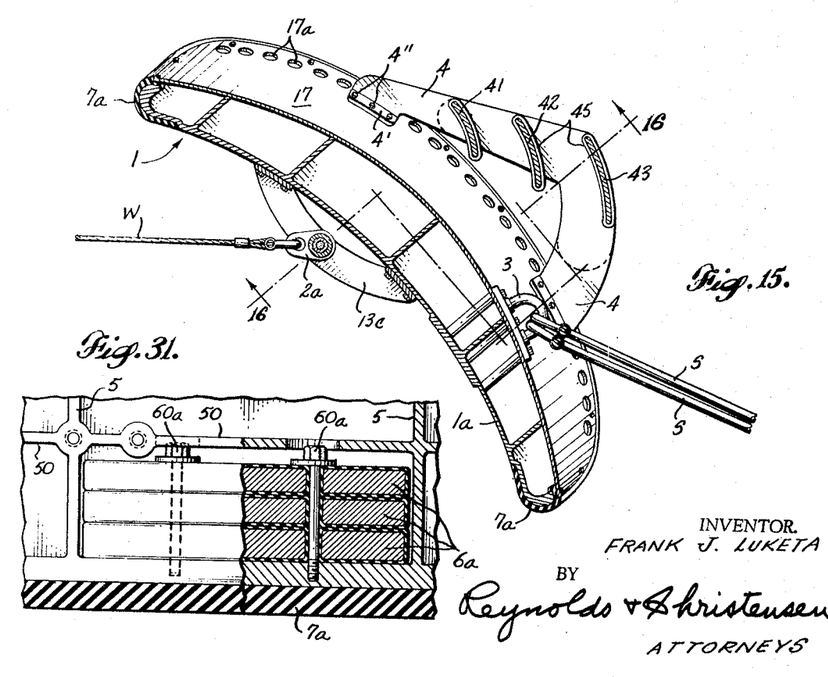
FIGURE 15 is a longitudinal section through the door, similar to FIGURE 4.
FIGURE 31 is a sectional detail showing a ballast weight and the means for securing the same in place.

The full advantage of a door cambered or of hydrofoil shape at its posterior surface, at least, is not realized until there is no tendency to turbulence at the posterior surface, and this is achieved, according to the present invention, by disposing one or more auxiliary cambered hydrofoils 41, 42, 43, 44, etc. (the exact number is not material) at successive spacings behind but relatively close to the posterior convex surface 12, and at a location where the eddying begins; see FIGURES 9 and 13. When this is done, each such auxiliary hydrofoil intercepts eddy currents, and tends to direct them inwardly, as indicated at E, to cause the water to flow smoothly past the posterior surface 12 as indicated at S, and at somewhat increased lateral velocity. The drag created by eddying is thereby prevented, which allows the door to produce as large a "lift" L as before, but its decreased drag D lessens the power required, and the increased lateral velocity tends to spread the doors more widely apart, and so increases efficiency notwithstanding that the general plane P of the door is at a relatively high angle of attack.

Figure 16:
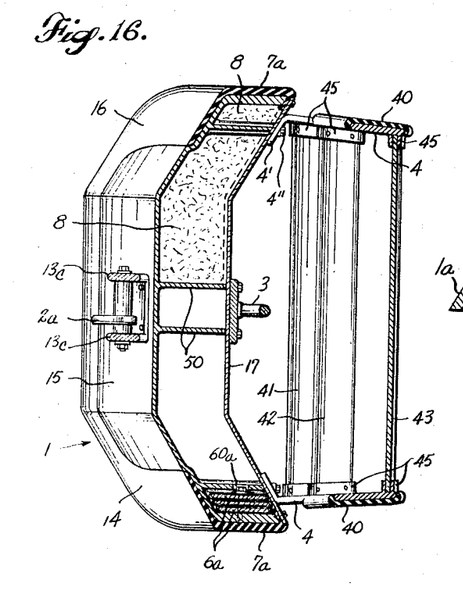
FIGURE 16 is a vertical section through the door corresponding to FIGURE 5, taken at line 16—16 of FIGURE 15.
Figure 17:
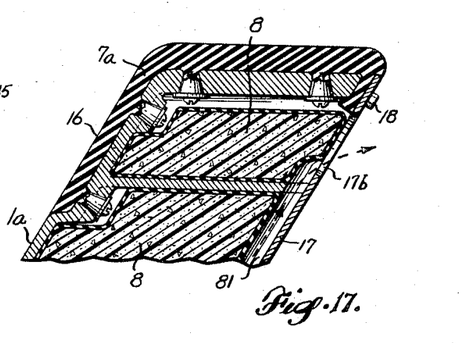
FIGURE 17 is an enlarged vertical section of the upper edge of the door, showing details of construction.
Figure 18:
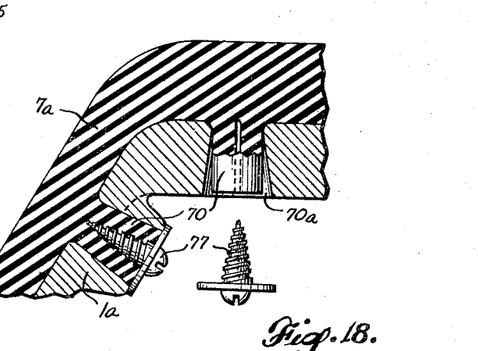
FIGURE 18 is a further enlarged vertical section illustrating the means for securement of the protective edging.
Figure 19:
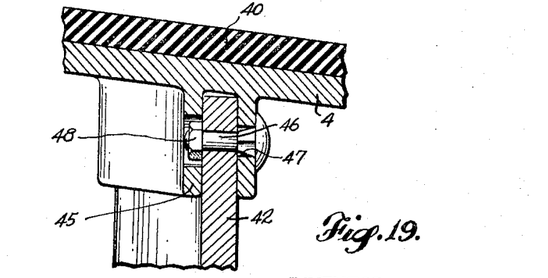
FIGURE 19 is a detail in section of the mounting of an auxiliary hydrofoil in a supporting bracket.

The auxiliary hydrofoils 41, 42, etc. are supported from opposite brackets 4, which are secured to the body 1 at its posterior surface 12 in proper disposition and orientation, as by flanges 4' and bolts 4". One such bracket is located near the upper edge of the door, and the other near its lower edge, and each can be protected against wear, should one engage the bottom, by a protective pad 40 of abrasion-resistant rubber. The support of the individual hydrofoils may be accomplished in any convenient manner, but as shown each bracket 4 is formed with sockets 45 each facing the opposite bracket, within which is received the end of a hydrofoil 41, 42, etc. Each hydrofoil may be secured in its socket 45 by means such as are best shown in FIGURE 19, namely, by a carriage bolt 46 within a square hole 47 in one wall of its socket 45, and a nut 48 received within a large hole 49 in the opposite wall of the socket, clamping the hydrofoil against the first wall. The brackets 4 serve to give directional stability to the door. They may lie in a plane parallel to the bottom, as seen in FIGURES 2, 3, 5 and 8, or they may be sloped away from the bottom, as in FIGURE 16, to more surely avoid contact with the bottom.

The door, whether cambered or not, is preferably formed with rearwardly inclined lower and upper edge portions or bands 14 and 16, respectively, of equal area. These might adjoin one another, at opposite sides of a longitudinal apex line midway between the upper and lower edges, or, as shown, they are separated by an intervening central portion or band 15, which while the door is in use is upright. All such bands are shown as of hydrofoil shape longitudinally. The dihedrally related bands 14 and 16, in cooperation with the below-center location of the anchorage of the towing warp W to the door, already mentioned, afford stability to the door in a manner explained below.

The lower edge of the door drags over the bottom, and should bear thereon evenly throughout its length. The towing warp W is anchored to the door's anterior or concave face at the shackle 2. This shackle 2, as already explained, is located close into and slightly ahead of the door's longitudinal midpoint, and somewhat below the longitudinal center line of the door. Such a below-center location produces a tendency for the upward component of the pull of the towing warp to tilt the door backwardly about its lower edge, and so counters the drag of the bottom against such lower edge. As a result the door tends to remain upright as it advances, and desirably can be so arranged as to tilt rearwardly slightly. The small longitudinal moment arm from the anchorage 2 rearwardly to the midpoint of the door's length tends to prevent uptilting of the door's forward end 10 off the bottom, especially when assisted by the location of ballast weights forwardly, as will be explained later. The upper dihedral band 16, when the door is tilted somewhat backwardly, causes the door, by water reaction, to be strongly urged downwardly, and therefore it will stay on the bottom more surely with a minimum of ballast.

Thus there are forces arising from the dihedral disposition of bands 16, 14, from the below-center location of anchorage 2, from the latter's short spacing ahead of the longitudinal midpoint of the door, and from the longitudinal disposition of the ballast weights, which cooperate to maintain the door at the proper angle of attack, yet held down to and bearing evenly along the lower edge upon the bottom, and approximately upright as it advances.

Inasmuch as the lower edge bears upon and drags over the bottom, wear occurs there, and should be absorbed by a protective element. For example, a pad 7 of wear-resistant rubber is vulcanized or otherwise held in place upon the door's lower edge (FIGURES 5 and 8), and can be renewed when worn, or as shown in FIGURES 16, 17, 18, 23, 24 and 25, and as is preferable, a complete ring 7a encircles all the edges of the door, and is removably secured in place, so that it is replaceable when worn at both horizontal edges. The ring 7a may be formed with numerous inwardly directed studs 70 fitting sockets or apertures 70a about the rim of the door, and with a flange 71 shouldered at 72, the flange being pinched between the body structure 1a and the removable cover 17 by the hold-down bolts 18. A nut 18a (FIGURES 25 and 26) receives the threaded end of each bolt 18. The shoulder 72 reacting against the body structure 1a assists in retaining the ring 7a. Screws 77 received in the studs 70 expand the latter (FIGURE 18) and so retains them in their conical holes 70a.

When the protective edging 7a is employed, the trawler can carry a spare, and whenever one becomes unduly worn, it can be replaced with little loss of time, whereas with shoes or the like that are bonded in place, the door as a whole must be shipped to a repair station, and replacement is bound to be expensive, and a cause of delay.

The door is ballasted at its lower edge. While the location of ballast weight longitudinally would be governed by the door's balance, and by any tendency to tilt upwardly its forward end—the aim being to have it bear equally upon the bottom along its lower edge—the towing warp anchored at 2 produces some upward component, especially when wave action or the like tends to jerk and pull the warp taut. Accordingly, it is preferred that the ballast be concentrated towards the forward end O of the door's lower edge. Ballast weight or weight blocks 6 are shown, so located.

Figure 3:
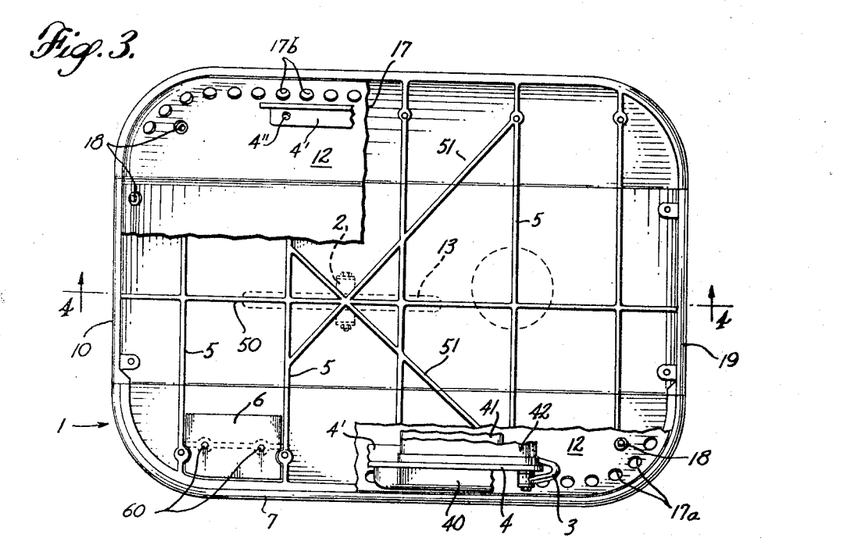
FIGURE 3 is a view similar to FIGURE 2, but with the cover and other portions of the door considerably broken back to illustrate the interior construction.
Figure 4:
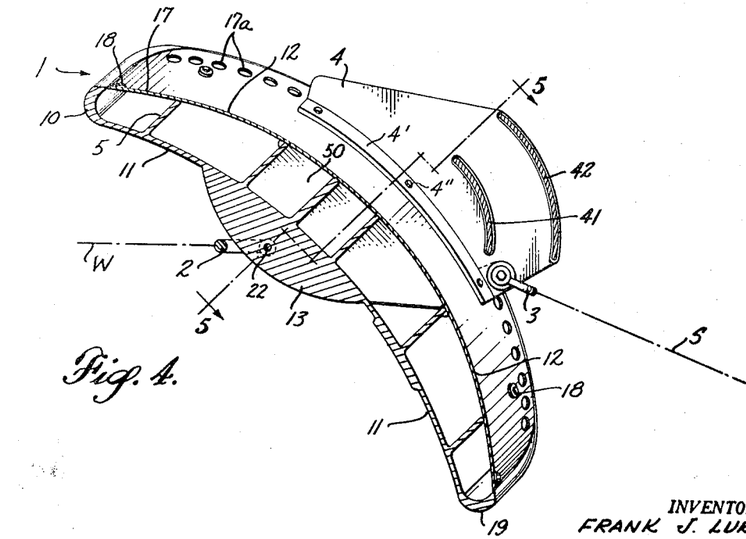
FIGURE 4 is a general longitudinal section through the same door, taken substantially at the plane indicated by the line 4—4 of FIGURE 3.
Figure 5:
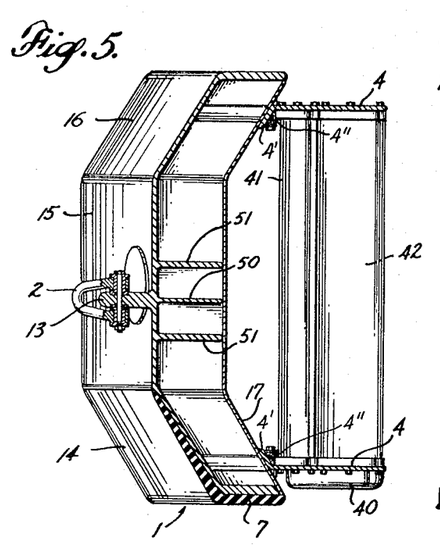
FIGURE 5 is a transverse section through the door on a vertical plane, taken substantially at the plane indicated by the line 5—5 in FIGURE 4.
Figure 6:
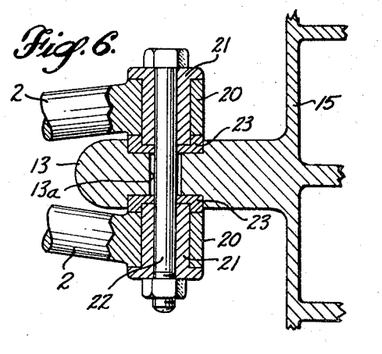
FIGURE 6 is a detail sectional view, enlarged, showing the mounting for an anchorage to the door.

It is preferred that the door be formed as a hollow nonbouyant body 1a, for instance of cast aluminum, covered by a light-weight back plate or cover 17 held in place by the bolts 18. It must, however, be drainable, and is so shown. In the form of FIGURES 1 to 8 it is provided with transverse or upright ribs 5 and a longitudinal rib or ribs 50, together with angularly disposed bracing ribs 51, which interconnect the anchorage point for the shackle 2 with the anchorage points for the shackles 3. The two latter points are interconnected again by a transverse rib or spreader 5, so that stresses are transmitted between the points of maximum stress in a most direct manner, and are strongly resisted. The rubber-coated ballast weight 6 shown in FIGURE 3 is mounted within a cell or cells within the hollow structure of the door, by bolts 60 or the like, and may be removed and shifted in location, as found necessary, upon removal of cover 17.

The door of FIGURES 1 to 8 is not intended to be reversible top for bottom, whereas the door of FIGURES 14 to 23 is thus reversible. The ballast weights 6a in the latter form are received alternatively in cells within the hollow door structure along the upper and lower edges (whichever edge is then the lower one), and are secured therein by the bolts 60a, see FIGURE 31.

Buoyance is afforded, at least temporarily, to the upper portion of the door body in any of a number of ways. In the form of FIGURES 1 to 8 the cells defined by interior dividers 5 and 50 are open, at least restrictedly, to the atmosphere when the door is out of water, by way of holes 17b along the upper margin of the body 1a or its cover 17. Along the lower margin of the same, drainage holes 17a communicate with the interior. When setting the net the initial few moments in the launching of the door are critical, because unless it automatically assumes its upright disposition and positive angle of attack it may veer inboard and foul gear at the opposite side. This will require that it be hauled in, cleared, and reset, with consequent labor and loss of time. The location of the ballast weight at the lower edge, and the buoyance afforded the upper edge by air temporarily trapped there, because it cannot at once escape through holes 17b, which holes must be regulated as to size, to provide the intended lag in escape of air, which, being replaced by water, causes the door to assume its correct orientation as it sinks in the water. Air escapes somewhat slowly through holes 17b, for reasons already given, and the temporary buoyance is dispelled. In consequence there is no residual buoyance which must be overcome all during use by providing extra ballast weights, as must the permanently buoyant means usually provided along a door's upper edge.

The door in the form of FIGURES 14 to 31, which is reversible top for bottom, accomplishes a like result in a somewhat different manner. Buoyant blocks 8 fit within cellules in the upper portion of the door's interior, and are held in place by the cover 17. Apertures in the horizontal dividers 50 afford communication between drain holes 17a and air exit holes 17b, in cooperation with channels 81 in blocks 8. Such communication is restricted, since the blocks partially mask the holes 17b. When the door is let into the water the ballast weights and the buoyant upper space causes it to assume the correct attitude, and as the water slowly displaces the air within the hollow door, it gradually loses its buoyance, which now is not needed, and if present would be detrimental, in that it would require added ballast; see FIGURE 23.

It is desirable to provide pivots for the shackle pins at 2 and 3 which will avoid wear on elements that are integral parts of the door itself, for if wear on the door parts were permitted, these would have to be replaced rather frequently, with considerable difficulty and expense, or the entire door would have to be discarded and replaced. Accordingly, I have adopted the construction shown in FIGURE 6. The shackle 2 (and the following applies to shackles 3) has the aligned eyes 20, within which are disposed bushings 21 which receive the tie bolt 22. The bushings bear at their ends on removable caps 23. The hole 13a in the rib 13 is oversize so that the tie bolt 22 does not bear therein. Rather, the eyes 20 pivot around the bushings 21. The bushings 21 and caps 23 are nonrotative, and are held against rotation relative to rib 13 by bolt 22. Any wear occurs in the eyes 20, bushings 21 and caps 23, which can be removed and economically replaced when sufficiently worn.

Figure 20:
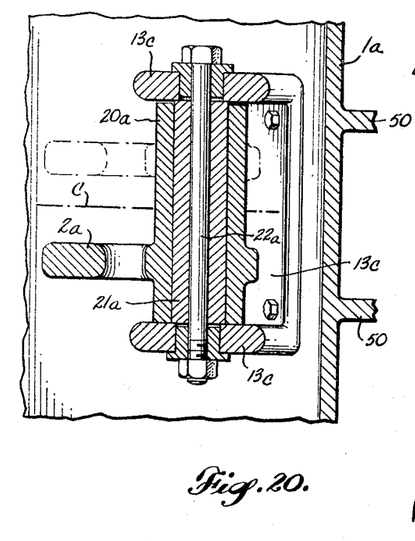
FIGURE 20 is a detail in section, illustrating the manner in which the anchorage for a towing warp can be relocated when the door is inverted.
Figure 21:
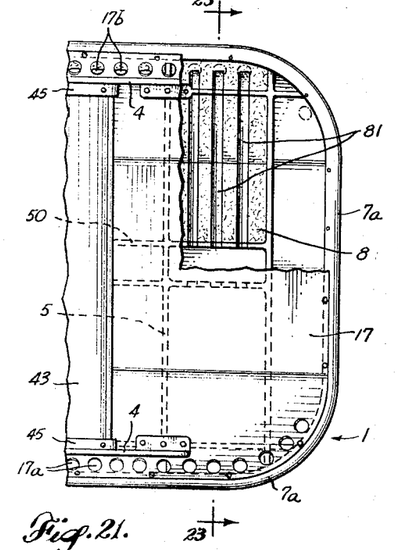
FIGURE 21 is a posterior elevational view, partly broken away, of an end of the door.
Figure 22:
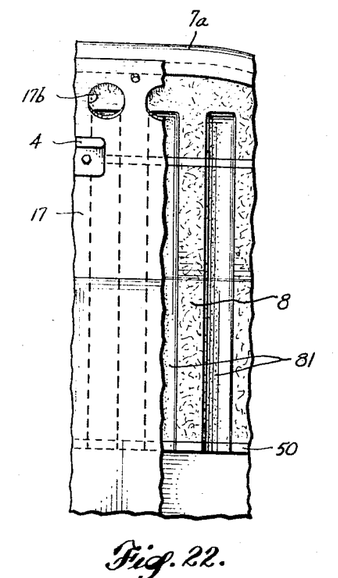
FIGURE 22 is a similar but enlarged view, these two views dealing with the means to provide temporary buoyance to the door's upper edge.
Figure 23:
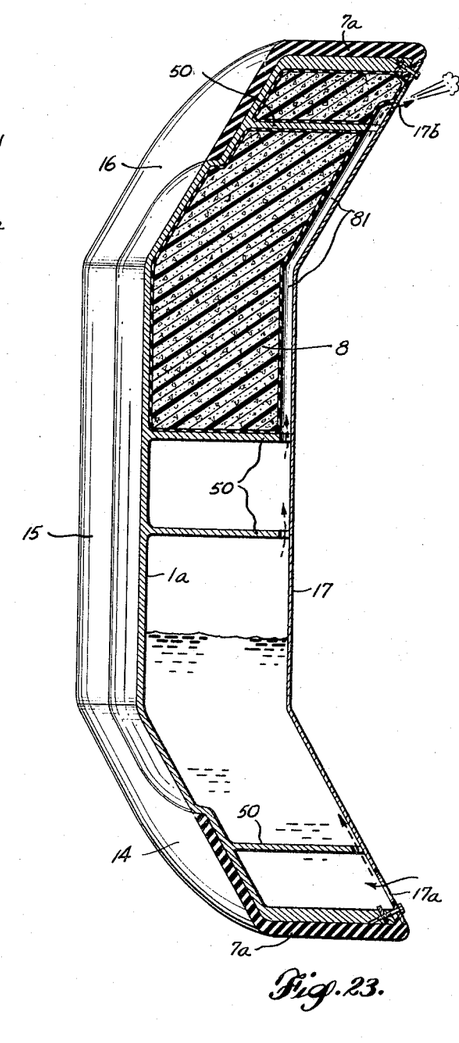
FIGURE 23 is an enlarged vertical section at the line 23—23 of FIGURE 21.
Figures 24, 25, 26:
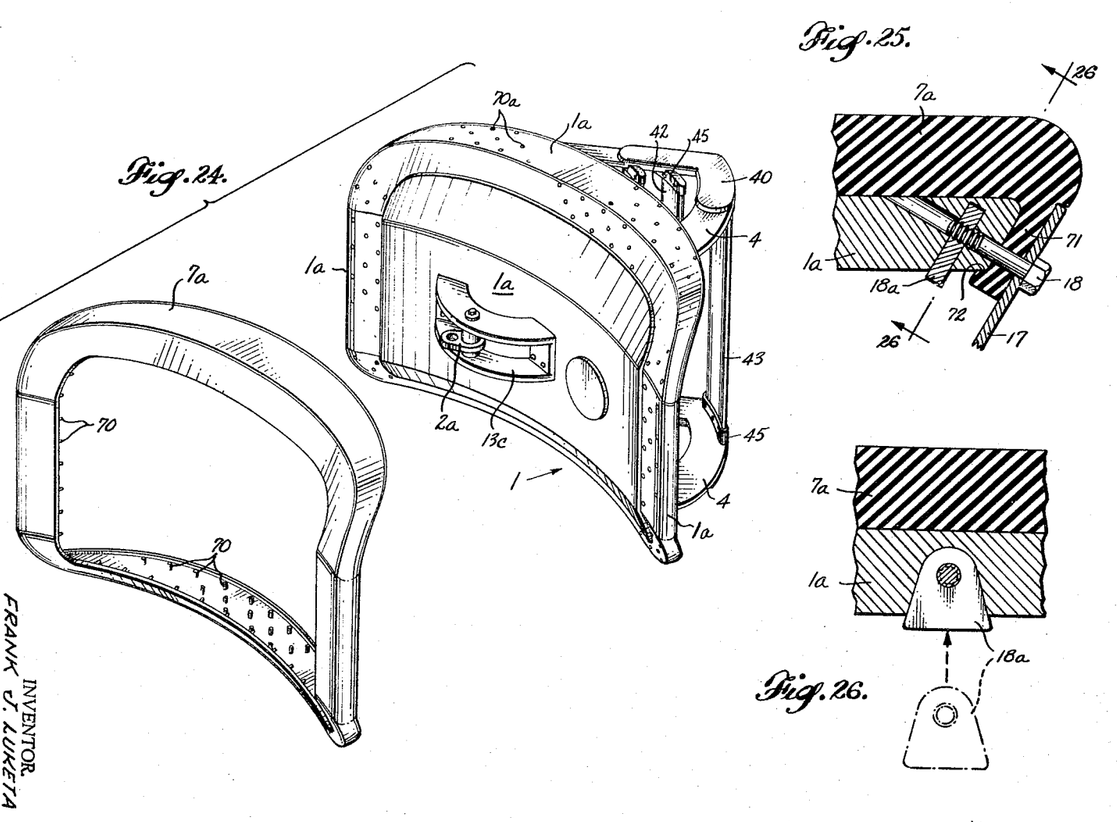
FIGURE 24 is an isometric view of the anterior surface of a door, fully assembled, and with its removable edging removed but in position for assembly upon the door.
FIGURE 25 is a detail, in cross-section, showing the manner of securement of the edging, and the back cover.
FIGURE 26 is a sectional view at the line 26—26 of FIGURE 25.
Figures 27, 28:
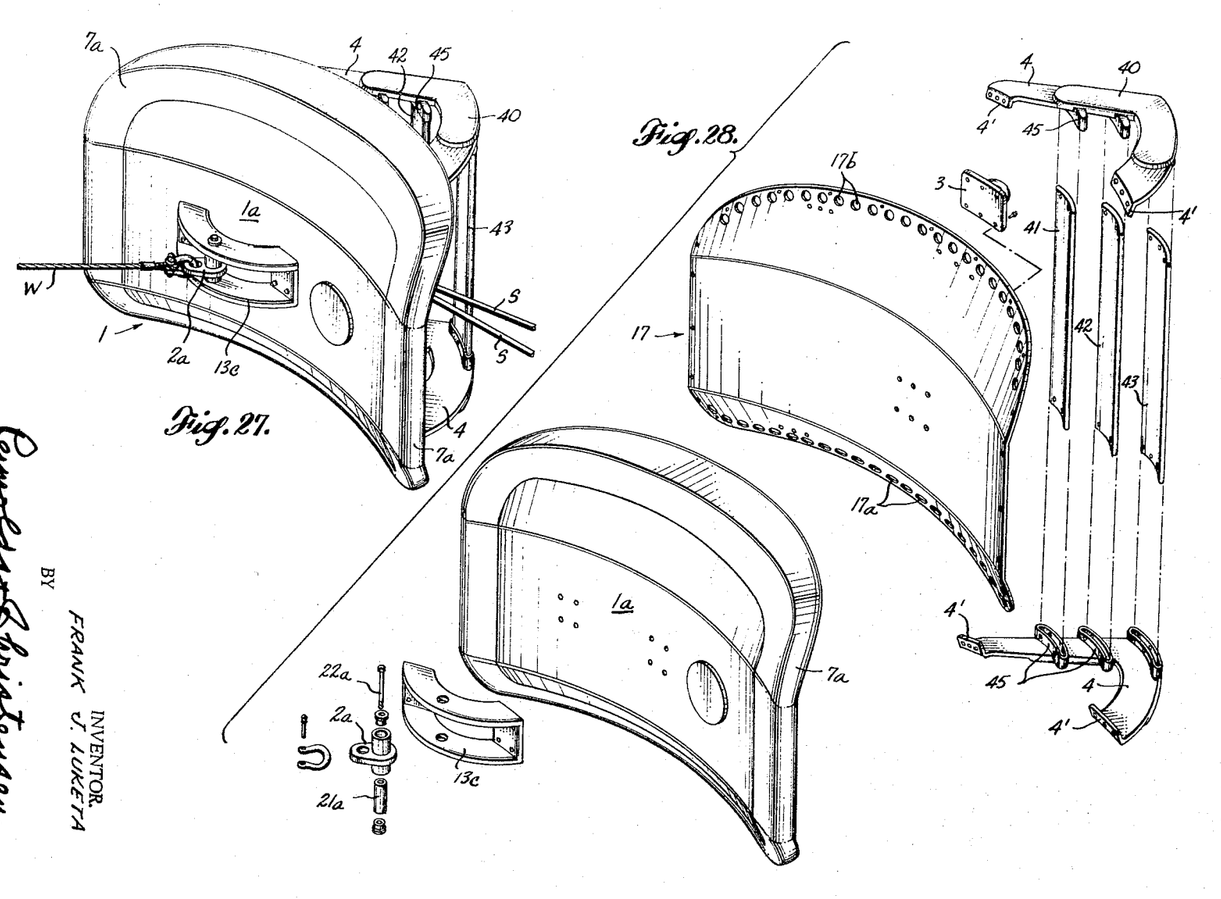
FIGURE 27 is an isometric view of the anterior face of the door, fully assembled and rigged.
FIGURE 28 is a somewhat similar view, with the parts exploded.
Figures 29, 30:
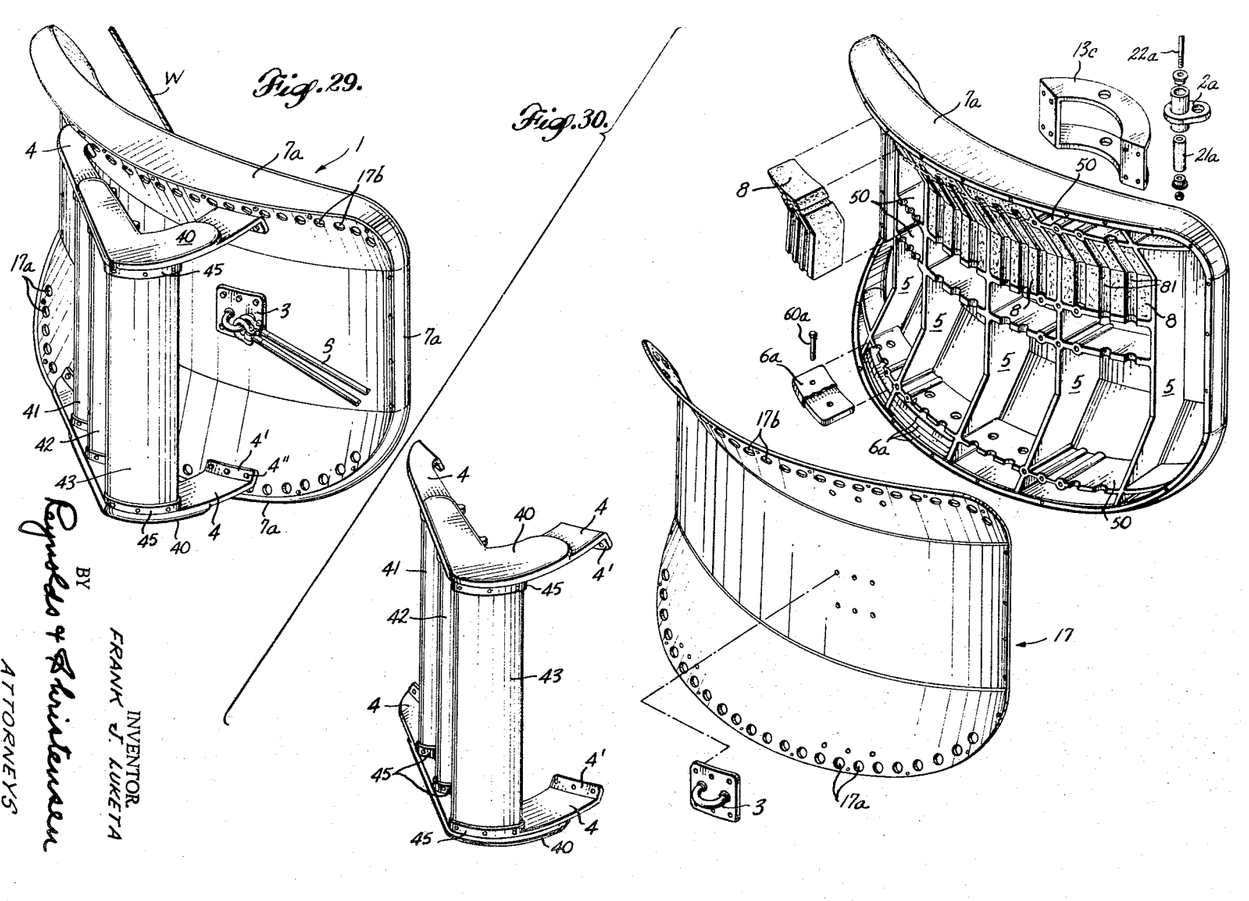
FIGURE 29 is an isometric view of the posterior face of the door, fully assembled and rigged.
FIGURE 30 is a somewhat similar view, with the parts exploded.

The reversible door of FIGURES 14 to 31 employs a modified form of anchorage for the towing warp. Whichever horizontal edge is uppermost, the shackle 2a should be below the longitudinal center line. It must be shifted when the door is inverted. As seen in FIGURE 20 the shackle 2a is formed with a pivot sleeve 20a that has a bushing 21a held by a pin 22a between ears 13b of a bracket 13c secured to the anterior face of the door body. The shackle 2a is located nearer one end of the pivot sleeve 20a than the other end. In the full line position of FIGURE 20 the shackle 2a is well below the center line C of the door, whereas if the shackle and pivot sleeve are inverted to the dot-dash line position, and the door too is inverted, the shackle is again in the correct below-center location.

What is claimed is:

1. A trawl door comprising a nonbuoyant body which is generally upright in use, and at least the posterior surface of which is of hydrofoil shape in the longitudinal direction, and auxiliary surfaces located behind the posterior face of the door in position to intercept incipient eddy currents and to direct them towards such posterior face and its trailing end.

2. A trawl door as in claim 1, wherein the auxiliary surfaces are of generally hydrofoil shape, and succeeding auxiliary surfaces are spaced outwardly from the posterior face of the door, and successively aft of the preceding auxiliary surface, when the door is in position of use.

3. A trawl door comprising a nonbuoyant hydrofoil body for disposition uprightly in use with its general plane at a selected angle of attack, anchorage means at its anterior surface for a towing warp, said anterior surface being formed as a hydrofoil which at its forward end makes a selected small angle to the direction of drag, but of progressively increasing angle towards its after end, and the body's posterior surface being convexly curved longitudinally, generally complementally to but of sharper curvature than its concave anterior surface, whereby its forward part is presented at a lesser angle to the direction of drag than the forward part of its anterior surface, and auxiliary hydrofoil surface means spaced aft of the body's posterior surface, said auxiliary hydrofoil surface means being located to intercept eddy currents that may tend to break away from the body's posterior surface, and to direct the same again towards that surface, and towards the after edge thereof.

4. A trawl door comprising a nonbuoyant body for disposition uprightly in use with its general plane at a selected angle of attack relative to its direction of advance, anchorage means at its interior surface for a towing warp, said anterior surface being formed as a hydrofoil having a given concavity fore and aft, which at its forward end makes a selected small angle to the direction of advance, but of progressively increasing angle towards its after end, and the body's posterior surface having a convexity fore and aft of lesser radius than the concavity of its anterior surface, but generally similarly shaped, to leave the body thicker in its portion intermediate its forward and after ends than at either such end.

5. A trawl door comprising a nonbuoyant body for disposition uprightly in use with its general plane at a selected angle of attack relative to its direction of advance, a first anchorage means at its anterior surface for a towing warp, a second anchorage means at its posterior surface and aft of said first anchorage means, for lines which extend to a net, said first and second anchorage means being located in an upright plane which is disposed at such angle to the general plane of the body as to create a moment to maintain the body at the selected angle of attack, said anterior surface being formed as a hydrofoil having a given concavity fore and aft, which at its forward end makes a selected small angle to the direction of advance, but of progressively increasing angle towards its after end, and the body's posterior surface having a convexity corresponding generally to the shape of the anterior surface, and auxiliary hydrofoil surface means spaced aft of the posterior surface, and located to intercept eddy currents that may tend to break away from said posterior surface, and to direct the same again towards that surface, towards the after edge thereof.

6. A trawl door comprising a nonbuoyant body generally of hydrofoil shape fore and aft, for disposition uprightly in use, at selected and increasing angles of attack relative to its direction of advance from its forward towards its after ends, respectively, anchorage means at its anterior surface for a towing warp, and upright auxiliary hydrofoil surface means supported from and spaced aft of the body's posterior surface, and towards its after end, in position to intercept eddy current that may tend to break away from the posterior surface, and to direct the same again towards that surface, and towards the after end thereof.

7. A trawl door for use in towing and spreading a wing of a trawl net, comprising a nonbuoyant body of generally concave-convex shape fore and aft, anchorage means at its anterior face for a towing warp, said anchorage means being located in effect somewhat nearer the lower edge than the upper edge of the body, to counteract the drag of the bottom upon its lower edge, and to maintain the door generally upright in use, said body having upper and lower bands at opposite sides of its longitudinal center line which are directed longitudinally and are relatively inclined dihedrally and rearwardly.

8. A trawl door comprising a nonbuoyant body which in use is disposed generally upright, having an anterior surface disposed at a selected angle of attack to the direction of advance, and a posterior surface curved convexly from a leading edge which is nearly tangent to the relative current towards a trailing edge which is at a relatively steep angle to the relative current, and at least one auxiliary surface outstanding behind the posterior surface of the body, at an angle to the relative current which follows the curvature of the leading edge portion of such posterior surface, and located to intercept such current where the same tends to break away from the posterior surface, and to return the same towards the posterior surface and the trailing edge portion thereof.

9. A trawl door for use in spreading a wing of a trawl net, comprising a nonbuoyant body which is generally upright in use, said body having a generally upright central band and laterally spaced upper and lower bands extending horizontally of its anterior face, and said upper and lower bands each being inclined rearwardly at an angle to the body's general upright plane, anchorage means affixed to its anterior face for a towing warp, said anchorage means being located in effect somewhat nearer the lower edge of the body than its upper edge, thereby tending to tilt the door rearwardly at its upper edge by the pull of the towing warp, although still remaining generally upright, in use.

10. A trawl door as in claim 9, wherein the areas of the upper and lower bands are generally equal, to produce equal and opposite tilting effects when the door is exactly upright, but the below-center location of the towing warp anchorage means tends to incline the door as a whole rearwardly at its upper edge, in use, to the extent that water flow over the rearwardly slanted upper band produces a downward force which helps to hold the door's lower edge on the bottom.

11. A trawl door as in claim 10, wherein the location of the towing warp anchorage means is sufficiently below a longitudinal center line of the door to counter the bottom drag force upon the lower edge of the door, and still to maintain the door tilted rearwardly.

12. A trawl door as in claim 9, wherein the door is of hydrofoil shape in the longitudinal direction, and further includes means affixed to its posterior face for intercepting and redirecting eddy currents towards the door's said posterior face.

13. A trawl door as in claim 9, wherein the towing warp anchorage means is located slightly ahead of the longitudinal midpoint of the door.

14. A trawl door as in claim 9, wherein said central band is generally parallel to the door's general plane.

15. A trawl door as in claim 9, further including anchorage means on the door for a rearwardly extending sweep line means, and wherein the effective locations of the respective anchorage means for the towing warp and the sweep line means are such as to maintain the door at a selected angle of attack and to equalize the longitudinally extending vertical stresses on the door, to maintain its lower edge in generally equal contact with the bottom throughout its length.

16. A trawl door comprising a nonbuoyant body ballasted to remain generally upright in use, said body having a bracket at its anterior face, said bracket having a pair of bracket ears spaced equally above and below the longitudinal center line of said body, an anchorage for a towing warp comprising a sleeve disposed uprightly between said bracket ears and releasably pivoted thereon, and an eye projecting from said sleeve, and located nearer to one end of the sleeve than to the other end.

17. A trawl door for trawl nets comprising a nonbuoyant hydrofoil body for disposition uprightly in use with its general plane at a selected angle of attack, said body including a central longitudinal band disposed uprightly in use, and upper and lower bands each disposed divergently rearwardly from said central band at obtuse vertical angles, and said body in its three bands being formed as a concave-convex hydrofoil, and one anchorage means for a forwardly directed towing warp and another for a rearwardly directed line at the net, said anchorage means being disposed in an upright plane one at the body's anterior surface and the other at its posterior surface, and the two being located at an angle to the general plane of the body, to create a moment during use, to maintain the body at the selected angle of attack.

18. A trawl door as in claim 17, the auxiliary hydrofoil surface means comprising a plurality of hydrofoil vanes spaced successively aft of the body's posterior surface, and horizontally disposed brackets supporting said vanes from the body.

19. A trawl door as in claim 18, wherein the posterior anchorage means are mounted on the respective brackets, and the anterior anchorage means is located intermediate the upper and lower brackets, at the anterior surface of the body.

20. A trawl door as in claim 18, and a protective pad mounted at the lower surface of the lower bracket.

References Cited by the Examiner

UNITED STATES PATENTS 2,942,371  1/1960  Johnson et al. _________ 43—9

FOREIGN PATENTS 1,260,072  3/1961  France.
26,332  11/1896  Great Britain.
223,500  10/1924  Great Britain.
523,452  7/1940  Great Britain.
533,121  2/1941  Great Britain.
168,471  6/1934  Switzerland.

SAMUEL KOREN, *Primary Examiner.*

W. H. CAMP, *Assistant Examiner.*